United States Patent
Lu et al.

(10) Patent No.: US 7,769,951 B2
(45) Date of Patent: Aug. 3, 2010

(54) INTELLIGENT CACHING OF USER DATA FOR REAL TIME COMMUNICATIONS

(75) Inventors: Ming Judy Lu, Sunnyvale, CA (US); Rajanikanth Vemulapalli, San Jose, CA (US); Alan S. Li, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 458 days.

(21) Appl. No.: 11/786,248

(22) Filed: Apr. 10, 2007

(65) Prior Publication Data

US 2008/0256298 A1    Oct. 16, 2008

(51) Int. Cl.
    *G06F 12/00*    (2006.01)
(52) U.S. Cl. .................. 711/120; 711/124; 711/165
(58) Field of Classification Search .......... 711/120, 711/124, 165
    See application file for complete search history.

(56) References Cited

U.S. PATENT DOCUMENTS

| | | | |
|---|---|---|---|
| 5,784,548 A * | 7/1998 | Liong et al. ................... 714/6 |
| 6,567,889 B1 * | 5/2003 | DeKoning et al. ........... 711/114 |
| 6,571,324 B1 * | 5/2003 | Elkington et al. ........... 711/162 |
| 6,810,259 B1 * | 10/2004 | Zhang ..................... 455/456.5 |
| 6,917,967 B2 * | 7/2005 | Wu et al. ................... 709/213 |
| 6,961,818 B1 * | 11/2005 | Sade et al. .................. 711/119 |
| 2002/0166031 A1 * | 11/2002 | Chen et al. .................. 711/141 |
| 2003/0140103 A1 | 7/2003 | Szeto et al. |
| 2003/0158999 A1 * | 8/2003 | Hauck et al. ................ 711/113 |
| 2004/0030750 A1 | 2/2004 | Moore et al. |
| 2004/0037271 A1 | 2/2004 | Liscano et al. |
| 2004/0054735 A1 | 3/2004 | Daniell et al. |
| 2004/0068567 A1 | 4/2004 | Moran et al. |
| 2005/0063216 A1 * | 3/2005 | Wilkins et al. ............... 365/154 |
| 2005/0213537 A1 | 9/2005 | Ingimundarson et al. |
| 2007/0083675 A1 | 4/2007 | Vemulapelli et al. |

FOREIGN PATENT DOCUMENTS

EP    1 549 024 A1    6/2005

(Continued)

OTHER PUBLICATIONS

International Search Report mailed on Dec. 27, 2006, for PCT Application No. PCT/US2006/038728 filed on Oct. 3, 2006, six pages.

(Continued)

*Primary Examiner*—Matt Kim
*Assistant Examiner*—John P Fishburn

(57) ABSTRACT

Apparatus and methods for storing user data for use in real-time communications (e.g., IM or VoIP) are provided. The apparatus comprises at least a first cache device (e.g., a cache server) and a second cache device for storing user data, wherein the user data stored with the first cache device is mirrored with the second cache device. The apparatus further comprising a server having logic for causing access to the user data (e.g., to respond to or process messages) from the first cache device, if accessible, and from the second cache device if the user data is not accessible form the first cache device. The apparatus may further include logic for causing user data to be restored to the first cache device from the second cache device if the first cache device loses user data (e.g., if the first cache device goes down).

20 Claims, 4 Drawing Sheets

FOREIGN PATENT DOCUMENTS

| | | |
|---|---|---|
| WO | WO-03/094011 A1 | 11/2003 |
| WO | WO-2004/059417 A2 | 7/2004 |
| WO | WO-2004/059417 A3 | 7/2004 |

OTHER PUBLICATIONS

Rosenberg, J. (Oct. 18, 2004). "A Framework for Conferencing with the Session Initiation Protocol Draft-letf-Sipping-Conferencing-Framework-03," *Internet Engineering Task Force (IETF)*, 36 pages.

Rosenberg, J. et al. (Jun. 2002). "SIP: Session Initiation Protocol," located at <http://tools.ietf.org/rfc/rfc3261.txt>, last visited on Feb. 13, 2007, 252 pages.

U.S. Appl. No. 11/713,330, filed Mar. 2, 2007, for Kota et al.

* cited by examiner

INTELLIGENT CACHING OF USER DATA FOR REAL TIME COMMUNICATIONS

BACKGROUND

1. Field of the Invention

This invention relates generally to storage devices and architectures for storing data, and in one particular example, for storing user data associated with a real-time communication application such as an Instant Messaging (IM) application or Voice over IP (VoIP) application.

2. Related Art

Many applications provide for real-time (or near real-time) communications between two or more clients via a network. One illustrative example includes instant messaging applications, which generally enable two or more participants to communicate over a computer network, such as the Internet or an internet (e.g., a private network), in more or less real time. Typically, each participant uses a client computer system to send and receive messages (including, e.g., text, voice, files, and the like) via a user interface. Each client computer in communication is connected via a network to an instant messaging service provider including a server. The server device receives and processes messages from participants, including by forwarding them to the client systems of the other participants for display.

Generally, user data (e.g., user records such as id lists, buddy lists, etc.) associated with each user communicating via a real-time communication application is stored in a conventional database accessible by an application server. Retrieving user data from conventional databases, however, is generally inefficient for desired instantaneous or near-instantaneous processing of requests and message delivery of real time communications. For example, querying a database, which may include disk I/O or the like, is generally time consuming. Accordingly, time delays for retrieving user data from the databases to facilitate real-time communications, particular as the number of users increases, deteriorates the user experience of real-time communications.

It is desired to store user data in a more efficient fashion and increase the accessibility of user data compared to conventional database access typically employed with real-time communication architectures. Further, a more flexible and scalable architecture allowing for the storage of user data associated with hundreds, thousands, or millions of users is desired.

SUMMARY

According to one aspect and one example of the present invention, apparatus for storing user data for use in a communication application (e.g., a real-time communication application such as an IM or VoIP application) is provided. In one example, the apparatus comprises at least a first cache device (e.g., a cache server) and a second cache device for storing user data, wherein the user data stored with the first cache device is mirrored or duplicated with the second cache device. The apparatus further comprises a server having logic for causing access to the user data (e.g., to respond to or process messages) from the first cache device, if accessible, and from the second cache device if the user data is not accessible form the first cache device. The apparatus may further include logic for causing user data to be restored to the first cache device from the second cache device if the first cache device loses user data (e.g., if the first cache device goes down or otherwise loses user data), and vice versa.

The apparatus may further comprise logic for keying user data to the cache devices based on a user login id, wherein each of the first and second cache devices serve two keys with alternating priority. The priority of the keys may change, e.g., if the first cache is down or otherwise inoperable to respond.

In another example, an apparatus (e.g., a server, connection server, gateway device, or combinations thereof) includes logic for accessing user data from a database, and causing the user data to be stored in a first cache device, wherein the user data is further duplicated with a second cache device. The apparatus further comprises logic for causing access to the user data from the first cache device in response to a received message and causing access to the user data from the second cache device in response to the received message if the first cache device is unable to respond.

According to another example, a method for facilitating communications is provided. In one example, the method comprises retrieving user data from a database, storing the user data into a first cache device, duplicating the user data stored in the first cache device with a second cache device, and accessing user data from the first cache device, if accessible, and from the second cache device if the user data is not accessible from the first cache device.

According to another example, computer-readable medium comprising instructions for facilitating communications is provided. In one example, the instructions are for causing the performance of a method including retrieving user data from a database, storing the user data into a first cache device, duplicating the user data stored in the first cache device with a second cache device, and accessing user data from the first cache device, if accessible, and from the second cache device if the user data is not accessible from the first cache device.

The present invention and its various aspects are better understood upon consideration of the detailed description below in conjunction with the accompanying drawings and claims.

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Generally, user data associated with real-time (or near real-time) communications is stored in databases included with, or accessible by, a service provider network. Retrieving user data from databases, however, is generally inefficient for real-time communications (such as IM, VoIP, and the like). For example, real-time communications typically desire instantaneous (or near instantaneous) processing of requests and message delivery. Accordingly, in one example, the user data is stored in cache devices (e.g., cache servers or other in process memory). Additionally, in one example, the user data is duplicated or mirrored in first and second cache devices to provide redundancy in case the user data from one of the cache devices is inaccessible (e.g., the device is down, a cache miss, etc.).

Examples described herein may provide several advantages. For example, storing user data in cache servers may increase access and response time to requests and message delivery relative to querying a database. Additionally, storing user data in the cache servers allows user data to be distributed across multiple devices and in multiple collocations, which can be easily scaled up as a user base grows. Further, back-up cache servers (and mirroring user data) provide redundancy such that user communications are not interrupted by server inoperability. Further still, cache memory generally provides a more flexible manner (relative to conventional databases and some caching system) in which to add new data structures (e.g., adding a new data field) as well as new applications.

Figure 1:
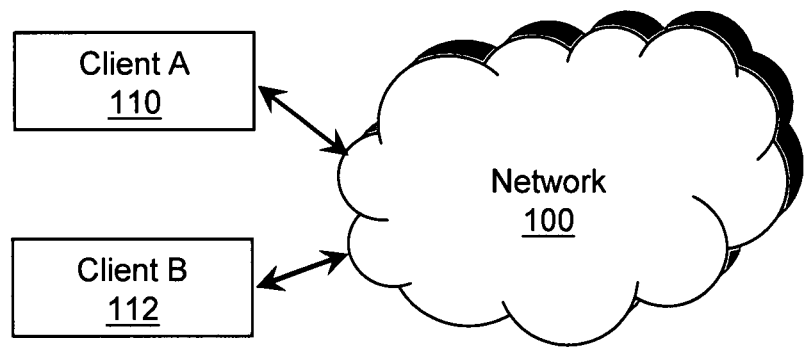
FIG. 1 schematically illustrates an exemplary system and environment for real-time communication between two clients.

Initially, and with reference to FIG. 1, an exemplary environment is illustrated in which some aspects of the present invention described herein may be used. The examples are described generally for an IM application. It will be recognized by those of ordinary skill in the art, however, that the exemplary system may be adapted for other applications, such as VoIP and the like for communication between two or more clients within one or more networks.

Broadly, a service provider network 100 (e.g., an IM service provider network, VoIP service provider network, etc.) having first and second clients 110 and 112 logged in, e.g., via a service provider protocol, are shown. The service provider network 100 may communicate, at least in part and in one example, via Session Initiation Protocol ("SIP") and Session Initiation Protocol for Instant Messaging and Presence Leveraging Extensions ("SIMPLE") based protocol. SIP/SIMPLE is illustrative of one protocol for intercommunication and interoperability between one or more service providers and clients to facilitate real-time communications and presence functionality, for example. Further, SIP/SIMPLE may further support client-to-server, server-to-server, peer-to-peer interoperability for voice, video, and the like to enable various other real-time communications such as VoIP applications.

Those of ordinary skill in the art will recognize that various other communication protocols (whether open or proprietary) are possible and contemplated whether used alone or in combination with other communication systems/methods. Various modifications may be made to the SIP/SIMPLE protocol depending, for example, on the particular service provider applications and functionality desired. For example, one may modify any well known protocol such as SIP/SIMPLE to be used more efficiently (e.g., with respect to transmission speed, process, cost, etc.) within a given network. Further, other suitable communication protocols such as Extensible Messaging and Presence Protocol (XMPP) or the like that enable or facilitate communication may be used alone or in combination with the SIP/SIMPLE protocol.

Clients 110 and 112 may include, for example, users accessing IM accounts via an internet browser, a personal computer, mobile device, such as a cellular phone or laptop personal computer, and the like. A user is typically connected via a network (such as the Internet or an intranet) to one or more servers associated with an IM service provider for the particular user IM account.

Clients 110 and 112 may communicate via a wireless network, such as a wireless gateway, e.g., a cellular, satellite, or other wireless network. Additionally, the computer device may communicate via a non-wireless network such as a cable or fiber optic network, or a combination of wireless and non-wireless systems. The computer device may include suitable hardware and software, such as a processor connected to an input device such as a keyboard, a network interface, a memory, and a display. The memory may include logic or software operable with the device to perform some of the functions described herein. The device may be operable to include a suitable interface for a messaging facility, such as an email inbox, instant messaging (IM), short messaging service (SMS), multimedia messaging service (MMS), voice, video, and the like. The device may further be operable to display a web browser for accessing the Internet or user accounts, including webmail environments such as a Yahoo!® mail account or Hotmail® account, for example.

Network 100 may be in communication with or include one or more server and database systems in communication with other networks and capable of wirelessly communicating with devices of a plurality of users. Exemplary server systems may include various routers, databases, gateways, and servers, such as an edge or proxy server, a gateway server, a mobile server, email sever, web server, voice messaging server, and the like. Further, network 100 may include a wireless network and one or more local area networks (LANs) and/or wide area networks (WAN), such as the Internet, that enables communication between various users, devices, servers, agents, modules, clients, processors, and the like.

Figure 2:
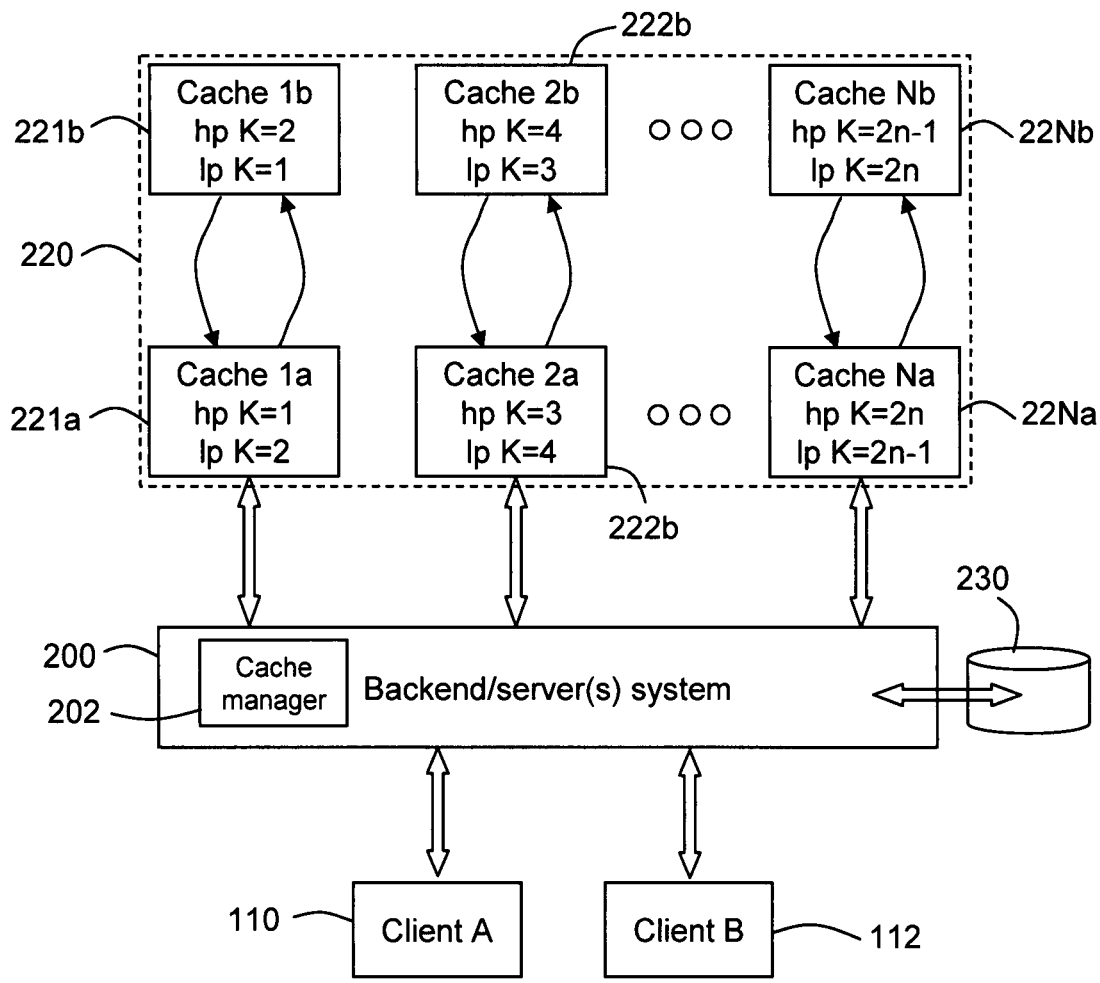
FIG. 2 schematically illustrates an exemplary partitioned memory system for storing user data and facilitating client communications.
Figure 3:
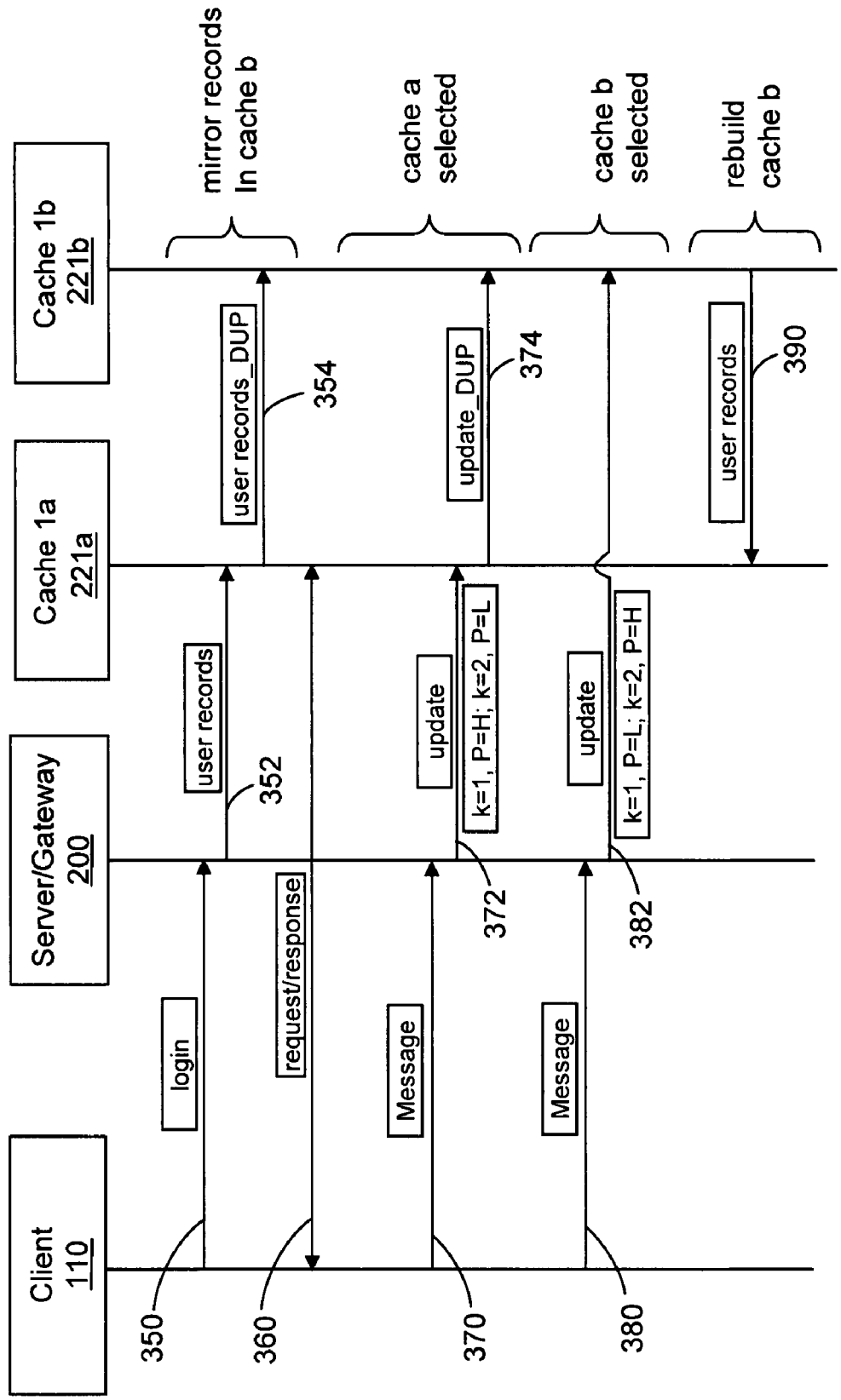
FIG. 3 schematically illustrates an exemplary timing chart for storing user data and facilitating client communications via the exemplary system shown in FIG. 2.

FIG. 2 schematically illustrates an exemplary architecture for caching user data associated with a communication application. Further, FIG. 3 illustrate an exemplary timing chart between some components of the exemplary architecture of FIG. 2 during a process of storing user data and restoring user data if a cache device goes down; accordingly, FIGS. 2 and 3 are referenced in combination. Although described generally with respect to an IM application, it will be recognized that similar architectures may be used for other applications for communication between client devices, such as VoIP and the like. Further, not all the components may be required, and variations in the arrangement and type of the components may be made without departing from the spirit and scope of the invention.

Broadly, the exemplary architecture includes a server 200, operable to communicate with clients 110 and 112 and a database 230 for storing user data (e.g., user records). Server 200 is operable to retrieve or receive user data from a database 230 and store the user data with a memory bank 220, which includes cache devices for relatively fast access and responses (compared to access time from database 230) during communication between clients 110 and 112. In particular, memory bank 220 includes at least two cache devices 221a and 221b for storing user data retrieved from database 230 and associated with clients 110 and 112. The user data duplicated or mirrored with cache devices 221a and 221b to provide redundancy if one of the cache devices 221 or 221b goes down.

Cache devices 221a, 221 b, etc., generally allow user data to spawn across multiple servers, wherein each server stores the data (e.g., user records) in a memory database (e.g., a cache), thereby avoiding, e.g., disk I/O, and potentially improving throughput of the system. Cache devices 221a, 221b, 222a, 222b, 22Na, and 22Nb may include various types of memory including, for example, RAM, SRAM, or the like. It is noted that several of the examples described herein refer to "cache devices," e.g., cache servers or hosts; however, it will be understood by those of ordinary skill in the art that other memory devices are possible and contemplated.

In this document, the terms "computer program product" and "computer-readable storage medium" may be used generally to refer to media such as, for example, memory 508, storage device 518, or storage unit 522. These and other forms of computer-readable media may be involved in providing one or more sequences of one or more instructions to processor 504 for execution. Such instructions, generally referred to as "computer program code" (which may be grouped in the form of computer programs or other groupings), when executed, enable the computing system 500 to perform features or functions of embodiments of the present invention.

In one example, server 200 includes or accesses retrieval logic for causing the retrieval of user data associated with the user of client 110 in response to client 110 logging in (e.g., entering credentials). For example, cache manager 202, included with server 200, may include logic for carrying out some or all of the functions described herein. The user data may be retrieved from database 230, located remotely or locally to server 200. User data may include, for example, id lists, buddy lists, ignore lists, visibility lists, presence data, and so on for use during communications.

Server 200, and in one example, cache manager 202, further includes or accesses logic for causing a portion or all of the retrieved user data from database 230 (and/or from client 110) to be communicated to and stored with a first memory portion, e.g., cache device 221a, shown as "Cache 1a." The user data is further duplicated or mirrored to memory device 221b, shown as "Cache 1b." In one example, the duplication is caused by logic included or associated with cache device 221a and/or memory bank 220. In other examples, the duplication may be caused by logic included or associated with server 200.

In one example, user data received from database 230 is keyed based on the user, e.g., based on a user's login identification, and mapped to one of the cache devices 221a, 221b, 222a, 222b, ... 22Na, 22Nb within the memory device bank 220 (or "cache bank"). Thus, a user's alias record may hold the user's login id to serve as a key pointing back to the main record within one of the cache devices. The key may include a primitive type of data, such as an integer (as shown, e.g., K=1, 2, 3 . . . ), string, list of string, nested structures, and so on. In other examples, the key may be based on other information unique to the user, e.g., device ID, conversation session ID, conference room ID, phone number, or the like.

With particular reference to FIG. 3, in response to a user of client 110 logging in, user login information is communication to server 200 at 350. The user records may be retrieved by server 200 from database 230 and keyed to the available cache devices of memory bank 220. Server 200 then communicates the user data to a cache device based on the key, in this example to cache device 221a, for storage at 352. Additionally, the user records are mirrored to cache device 221b at 354. In one example, server 200 thereafter uses cache device 221a for facilitating communications between client 110 and another client (e.g., client 112 shown in FIG. 2) and updating user records as indicated at 360. As user records are updated with cache device 221a, the updates to user records, e.g., changes, deletions, additions, etc., are communicated and mirrored with cache device 221b (e.g., at 370, 372, and 374 described in greater detail below).

For example, all incoming update requests from clients 110 and 112 to cache device 221a are replicated to a "peer host machine," i.e., cache device 221b (or vice versa). For example, the request received by cache device 221b having its status field set to duplicate, e.g., "DUP." In one example, user updates are evenly distributed to the A and B banks based on keys generated by hashing the user IDs. If a user update is originally received by cache device 221a, cache device 221a will process the request, update its cache, send a reply to the client if appropriate, and in addition, mark the request as duplicate before mirroring it to cache device 221b. Cache device 221b will determine that it is a DUP request and update its cache for data redundancy only, i.e., without sending a reply to the client. Similarly, if a user update is served by cache device 221b initially, server cache device 221b will update its cache and reply to the client and mirror the request to cache device 221a after marking it as duplicate. Cache device 211a will then update its cache for data redundancy.

In one example, an even distribution of user records to the cache devices may be achieved using a simple hash function and shared memory proxy ("Shmproxy") keyed mode. Further, the cache devices may include two external Shmproxy TCP connections for clients to update user data and for query operations. Additionally, the cache devices may include two internal Shmproxy TCP connections for data replication and retrieval between associated cache devices such as between cache devices 221a and 221b.

In one example, cache devices 221a and 221b each serve two keys with alternating high/low priority as shown in FIG. 3. For example, cache device 221a serves a first key having a high priority, e.g., k=1, P=H, and a second key having low priority, e.g., k=2, P=L, and cache device 221b serves a first key having low priority, e.g., k=1, P=L, and a second key having high priority, e.g., k=2, P=H, where "k" indicates the key associated with one pair of cache devices of the memory bank 220 and "P" indicates priority as high "H" or low "L."

A first message (e.g., an update request or the like) associated with a user of client 110 is received by server 200 at 370. Server 200 determines the keys from the user login id (or equivalent) and routes the request at 372 to the appropriate device, here cache device 221a (e.g., k=1, P=H). The message is further communicated to cache device 221b at 374 to duplicate or mirror the user data therewith. As described, the cache devices are partitioned into pairs, for example, cache devices 221a and 221b forming a pair (and as previously discussed, many pairs may be included with a single collocation). Cache devices 221a and 221b each serve the same set of two keys with alternating priority. In one example, cache devices 221a and 221b are pre-configured to mirror updates to each other. In another example, a third party can be responsible to route an update request to both cache devices 221a and 221b, with one of them receiving the request marked as DUP.

Subsequently, if cache device 221b is selected for a received message 380, e.g., based on the priority given to the associated keys, the message is routed from server 200 to cache device 221b as indicated by 382. The priority of the keys may have changed because cache device 221a is down. For example, cache device 221a has k=1, p=H and k=2, p=L, and cache device 221b has k=1, p=L and k=2, p=H. If a user id is hashed to key 1, the request goes to cache device 221a since it serves k=1 with high priority. In the case where 221a is down, however, the user request will be routed to 221b, since it also serves k=1, although at lower priority.

Cache device 221b may thereafter update cache device 221a at 390 to mirror the user data with cache devices 221a and 221b. In instances where cache device 221a lost a portion or all of the user data stored therein, cache device 221a may be rebuilt or restored at 390 from the user data stored with cache device 221b (which duplicated those of 221a and were used in the interim while cache device 221a was down). In other examples, cache device 221a could be restored from a database (e.g., database 230 or a persistent storage or database local to cache device 221a).

In one example, multiple memory banks 200 (each having two or more cache devices) as shown in FIG. 2 may be geographically distributed in multiple collocations. Further, a user's data may be distributed over multiple collocations, e.g., portions of a user's online records may be stored with different collocations. In such instances, a user's complete online record is an aggregation of the user's records stored with all collocations (e.g., stored distributively with cache server banks such as server system 220). In such instances, an additional piece of data may be used to identify the different collocations where user data is stored, thereby allowing server 200 (e.g., via cache manager client interface 202) to retrieve and use the records. In one example, cache devices 22xa, 22xb are individual servers, and cache manager software runs on each of the cache servers to populate and mirror data as described. The backend server 200 uses a client interface to access the cache data.

For example, upon login to a collocation, cache manager 202 registers with a Location Service (LS), which includes the cache manager 202 client API library used by server 200. When system 200 queries or updates a user's data using LS, LS will determine which collocations contain the user's data and send out relevant requests to those collocations. LS may further aggregates replies received from the collocations and sends the results to server 200. In one example, when the user logs out of the primary collocation the collocation registration is removed from the LS.

In one example, the collocation that includes the primary connection is flagged. Presence data is then set through the primary connection and is duplicated to the cache managers in all relevant collocations. For example, changes to user data (id list, buddy list, ignore list, visibility list, etc.) made through the primary connection are duplicated to the cache manager in all relevant collocations. In another example, changes to user lists could be delayed, in part or in whole until a connection in a particular collocation becomes primary.

Although not shown, the architecture of FIG. 2 may include or communicate with various additional components such as an edge proxy, gateway event servers, session managers, various databases, and the like. Other exemplary systems and architectures that may be used in conjunction with the described architecture includes those described in copending U.S. patent application Ser. No. 11/528,753, filed Sep. 27, 2006, and U.S. patent application Ser. No. 11/713, 330, filed Mar. 2, 2007 which is hereby incorporated by reference as if fully set forth herein.

Figure 4:
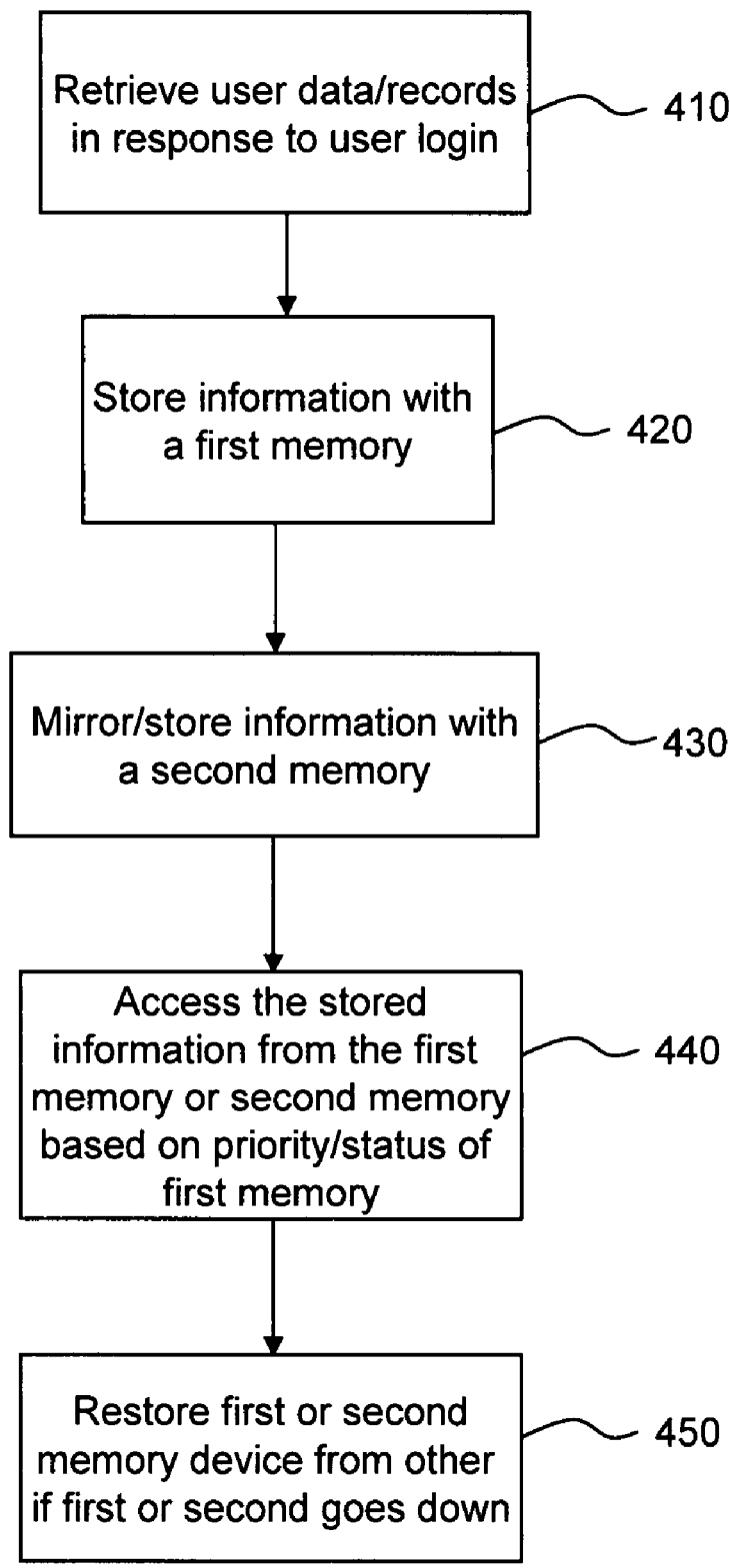
FIG. 4 illustrates an exemplary method for storing and backing-up user data.

FIG. 4 illustrates an exemplary method for facilitating communication using partitioned cache memory devices. The exemplary method may be caused by one or more servers, gateway devices, memory devices, or combination thereof and be caused by logic included or associated therewith. Further, in one example, a computer-readable medium may comprise instructions for causing the performance of the exemplary method.

Initially, the method includes receiving user data (e.g., user records) associated with a user in block 410. For example, a server may query a database and retrieve user data in response to the user logging into the server or an application associated with a server. In other examples, user data may be retrieved from a client device.

The method further includes storing the user data into a first memory device at 420. The first memory device may include, e.g., a cache server or other cache memory device as illustrated with respect to FIG. 2. The user data is duplicated or mirrored into a second memory device at 430. The second memory device may include, e.g., a cache server or other cache memory device similar or identical to the first memory device.

The method may further include accessing the stored information from the first memory device at 440; for example, to respond to requests from client devices. The method may include serving the two keys from a pair of cache device, the two keys having alternate high and low priorities, where user data is accessed based on the high priority key. A priority pointing to a first memory device for responses is followed unless the first memory device is inoperable (e.g., goes down, cache miss, etc.). In such an instance, the response may be made from the second memory device based on the low-priority key without disrupting the user experience.

As previously described, once the first memory device is back up (or replaced), the user data may be restored at 450 from the user data of the second memory device. Additionally, if the second memory device loses user data the data may be restored from the first memory device.

While aspects of the invention, including the above described method, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
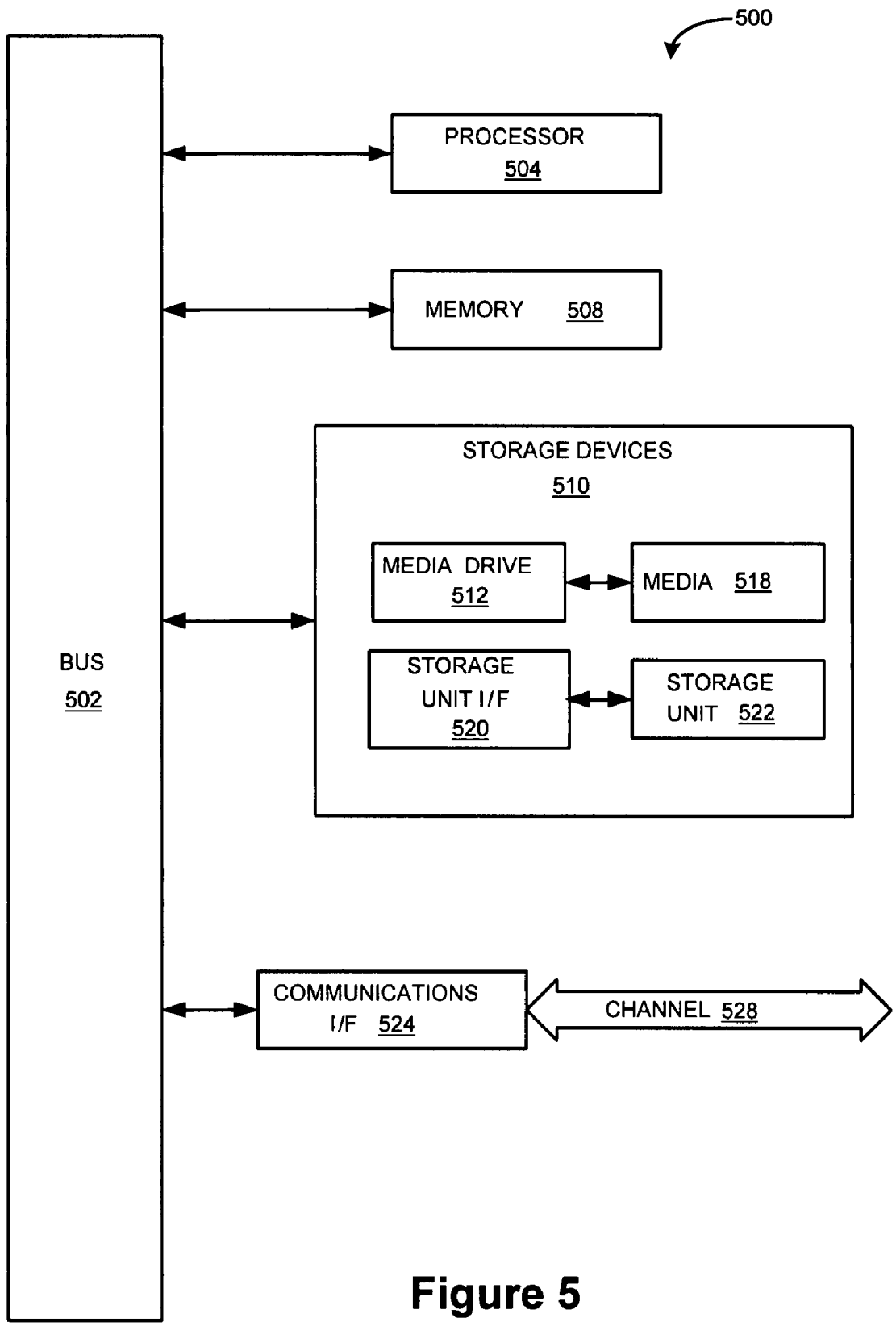
FIG. 5 illustrates an exemplary computing system that may be employed to implement processing functionality for various aspects of the invention.

FIG. 5 illustrates an exemplary computing system 500 that may be employed to implement processing functionality for various aspects of the invention (e.g., as a server device or system, cache device, memory device, client device, and so on). Those skilled in the relevant art will also recognize how to implement the invention using other computer systems or architectures. Computing system 500 may represent, for example, a desktop, mainframe, server, memory device, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, for example random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. Apparatus comprising:
  a first cached device and a second cache device for storing user data, wherein the user data stored with the first cache device is mirrored with the second cache device and wherein the user data is used in an Instant Messaging application or a Voice over IP application; and
  a server comprising logic for:
    determining a user key based on identification information associated with a user login;
    if the user key has a first value, causing access to the user data from the first cache device, if accessible, and from the second cache device if the user data is not accessible from the first cache device; and
    if the user key has a second value, causing access to the user data from the second cache device, if accessible, and from the first cache device if the user data is not accessible from the second cache device.

2. The apparatus of claim 1, further comprising logic for causing at least a portion of the user data to be restored to the first cache device from the second cache device if the first cache device loses the at least a portion of the user data.

3. The apparatus of claim 1, wherein the user key having the first value is assigned priority over the user key having the second key value in the first cache device.

4. The apparatus of claim 1, further comprising a memory bank comprising a first plurality of cache devices and a second plurality of cache devices, wherein the first plurality of cache devices includes the first cache device and the second plurality of cache devices includes the second cache device, and wherein the second plurality of cache devices mirror user data stored in the first plurality of cache devices, and user data is mapped to the first plurality of cache devices or the second plurality of cache devices based on the user key.

5. The apparatus of claim 1, further comprising logic for retrieving at least a portion of the user data from remote collocations.

6. The apparatus of claim 1, wherein the user data comprises user records associated with a real-time communications application.

7. Apparatus comprising logic for:
   accessing user data from a database, wherein the user data is used in an Instant Messaging application or a Voice over IP application;
   determining a user key based on identification information associated with a user;
   if the user key has a first value:
      causing the user data to be stored in a first cache device, wherein the user data is duplicated with a second cache device;
      causing access to the user data from the first cache device in response to a received message; and
      causing access to the user data from the second cache device in response to the received message if the user data from the first cache device is inaccessible;
   and
   if the user key has a second value:
      causing the user data to be stored in the second cache device, wherein the user data is duplicated with the first cache device;
      causing access to the user data from the second cache device in response to the received message; and
      causing access to the user data from the first cache device in response to the received message if the user data from the second cache device is inaccessible.

8. The apparatus of claim 7, further comprising logic for causing at least a portion of the user data to be restored to the first cache device from the second cache device if the first cache device loses the at least a portion of the user data.

9. A method comprising:
   retrieving user data from a database, wherein the user data is used in an Instant Messaging application or a Voice over IP application;
   determining a user key based on identification information associated with a user;
   if the user key has a first value:
      storing the user data into a first cache device;
      duplicating the user data stored in the first cache device with a second cache device; and
      accessing user data from the first cache device, if accessible, and from the second cache device if the user data is not accessible from the first cache device;
   and
   if the user key has a second value:
      storing the user data into the second cache device;
      duplicating the user data stored in the second cache device with the first cache device; and
      accessing the user data from the second cache device, if accessible, and from the first cache device if the user data is not accessible from the second cache device.

10. The method of claim 9, further comprising querying the database to retrieve the user data in response to a user login.

11. The method of claim 9, wherein the user key having a first value is assigned priority over the user key having a second value in the first cache device.

12. The method of claim 9, restoring at least a portion of the user data to the first cache device from the second cache device if the first cache device loses the at least a portion of the user data.

13. The method of claim 9, further comprising retrieving at least a portion of the user data from remote collocations.

14. The method of claim 9, wherein the user data comprises user records associated with a real-time communications application.

15. A computer-readable storage medium comprising instructions for storing and retrieving user data, the instructions for causing the performance of the method comprising:
   retrieving user data from a database, wherein the user data is used in an Instant Messaging application or a Voice over IP application;
   determining a user key based on identification information associated with a user;
   if the user key has a first value:
      storing the user data into a first cache device;
      duplicating the user data stored in the first cache device with a second cache device; and
      accessing user data from the first cache device, if accessible, and from the second cache device if the user data is not accessible from the first cache device;
   and
   if the user key has a second value:
      storing the user data into the second cache device;
      duplicating the user data stored in the second cache device with the first cache device; and
      accessing the user data from the second cache device, if accessible, and from the first cache device if the user data is not accessible from the second cache device.

16. The computer-readable storage medium of claim 15, the method further comprising querying the database to retrieve the user data in response to a user login.

17. The computer-readable storage medium of claim 15, wherein the user key having the first value is assigned priority over the user key having the second value in the first cache device.

18. The computer-readable storage medium of claim 15, the method further comprising restoring at least a portion of the user data to the first cache device from the second cache device if the first cache device loses the at least a portion of the user data.

19. The computer-readable storage medium of claim 15, the method further comprising retrieving at least a portion of the user data from remote collocations.

20. The computer-readable storage medium of claim 15, wherein the user data comprises user records associated with a real-time communications application.

* * * * *